United States Patent
Ly et al.

(10) Patent No.: US 11,917,716 B2
(45) Date of Patent: Feb. 27, 2024

(54) TWO-STAGE DISCOVERY IN SIDELINK

(71) Applicant: QUALCOMM Incorporated, San Diego, CA (US)

(72) Inventors: Hung Dinh Ly, San Diego, CA (US); Seyedkianoush Hosseini, San Diego, CA (US); Wei Yang, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/118,420

(22) Filed: Dec. 10, 2020

(65) Prior Publication Data

US 2022/0191674 A1     Jun. 16, 2022

(51) Int. Cl.
| | |
|---|---|
| *H04W 8/00* | (2009.01) |
| *H04W 76/11* | (2018.01) |
| *H04W 72/02* | (2009.01) |
| *H04W 72/044* | (2023.01) |
| *H04W 72/20* | (2023.01) |
| *H04J 13/00* | (2011.01) |

(52) U.S. Cl.
CPC ......... *H04W 8/005* (2013.01); *H04J 13/0029* (2013.01); *H04J 13/0062* (2013.01); *H04W 72/02* (2013.01); *H04W 72/046* (2013.01); *H04W 72/20* (2023.01); *H04W 76/11* (2018.02)

(58) Field of Classification Search
CPC ..... H04W 8/005; H04W 76/11; H04W 72/02; H04W 72/0406; H04W 72/046; H04J 13/0029; H04J 13/0062
See application file for complete search history.

(56) References Cited

U.S. PATENT DOCUMENTS

| | | | |
|---|---|---|---|
| 11,122,530 B2* | 9/2021 | Zhang | H04W 8/005 |
| 11,342,978 B2* | 5/2022 | Chen | H04B 7/0695 |
| 2014/0307611 A1* | 10/2014 | Tesanovic | H04W 74/08 370/312 |

(Continued)

OTHER PUBLICATIONS

International Search Report and Written Opinion—PCT/US2021/058347—ISA/EPO—dated Mar. 3, 2022.

(Continued)

*Primary Examiner* — Christopher M Crutchfield
*Assistant Examiner* — Tito Q Pham
(74) *Attorney, Agent, or Firm* — Procopio, Cory, Hargreaves & Savitch LLP/QUALCOMM Incorporated

(57) ABSTRACT

To more efficient sidelink communications, methods, apparatuses, and computer program products are provided. An example method of a first wireless device operating includes transmitting a sidelink discovery probing message comprising at least a first identifier of the first sidelink device. The example method further includes monitoring for a probing response from a second sidelink device. The example method further includes transmitting a sidelink discovery message if the first sidelink device receives the probing response from the second sidelink device. The example method further includes skipping transmitting the sidelink discovery message if the first sidelink device does not receive the probing response from the second sidelink device.

39 Claims, 12 Drawing Sheets

(56) References Cited

U.S. PATENT DOCUMENTS

| | | | | |
|---|---|---|---|---|
| 2015/0043545 | A1* | 2/2015 | Cheng | H04L 27/26136 370/336 |
| 2017/0295248 | A1* | 10/2017 | Fujishiro | H04L 67/16 |
| 2017/0347255 | A1* | 11/2017 | Liu | H04W 8/005 |
| 2018/0092017 | A1* | 3/2018 | Freda | H04W 76/14 |
| 2019/0037426 | A1* | 1/2019 | Yu | H04W 16/28 |
| 2019/0141645 | A1* | 5/2019 | Abouelseoud | H04W 12/06 |
| 2019/0253867 | A1* | 8/2019 | Abedini | H04W 16/14 |
| 2019/0296996 | A1* | 9/2019 | Wee | H04W 74/08 |
| 2020/0015298 | A1* | 1/2020 | Chae | H04W 72/04 |
| 2020/0059392 | A1* | 2/2020 | Lee | H04W 56/00 |
| 2020/0092685 | A1* | 3/2020 | Fehrenbach | H04W 4/46 |
| 2021/0168574 | A1* | 6/2021 | Zhang | H04W 56/001 |
| 2021/0212138 | A1* | 7/2021 | Ali | H04W 8/005 |
| 2021/0289580 | A1* | 9/2021 | Damnjanovic | H04W 76/27 |
| 2021/0354701 | A1* | 11/2021 | Lee | B60W 60/001 |
| 2022/0052820 | A1* | 2/2022 | Ling | H04L 1/18 |
| 2022/0124622 | A1* | 4/2022 | Islam | H04W 72/542 |
| 2022/0286184 | A1* | 9/2022 | Li | H04L 5/0051 |

OTHER PUBLICATIONS

3GPP TS 23.303: "3rd Generation Partnership Project, Technical Specification Group Services and System Aspects, Proximity-Based Services (ProSe), Stage 2 (Release 16)", 3GPP, Mobile Competence Centre, 650, Route Des Lucioles, F-06921 Sophia-Antipolis Cedex, France, vol. SA WG2, No. V16.0.0, Jul. 9, 2020, pp. 1-130, XP051924379, chapters 5.3.7, 4.6.4.3, 4.6.4.9, 4.6.4.10, 3.1, 4.3.1, 4.4.1.1, 4.6.4.1-4.6.4.2b, 4.6.4.11, 4.6.4.12, 5.3.2-5.3.6A.2.3, 5.5.4-5.5.9, B, Section 5.3.1.2, section 5.3.7 and section 5.3.7.1.

3GPP TS 38.212: "3rd Generation Partnership Project, Technical Specification Group Radio Access Network, NR, Multiplexing and Channel Coding (Release 16)", 3GPP TS 38.212, V16.3.0, Sep. 2020, pp. 1-147, sections 8.3 to 8.4.1.2.

3GPP TS 38.213: "3rd Generation Partnership Project, Technical Specification Group Radio Access Network, NR, Physical Layer Procedures for Control (Release 16)," 3GPP TS 38.213, Mobile Competence Centre, France, vol. RAN WG1, No. V16.3.0, Oct. 2, 2020, pp. 1-179, XP051961308, clause 7.2.1, p. 24-26 clauses 9 9.1, p. 49-76 clause 9.2, p. 77, paragraph 1-4, p. 81, paragraph 14-p. 82. Paragraph 1, p. 47, paragraph 3, p. 76. paragraph 7-10, Section 11. 2A, section 16.2.3 and section 16.3.

3GPP TS 38.214: "3rd Generation Partnership Project, Technical Specification Group Radio Access Network, NR, Physical Layer Procedures for Data (Release 16)", 3GPP TS 38.214, V16.3.0, Sep. 2020, pp. 1-165, Sections 8.1 and Section 8.1.4.

\* cited by examiner

TWO-STAGE DISCOVERY IN SIDELINK

INTRODUCTION

The present disclosure relates generally to communication systems, and more particularly, to sidelink communication based on discovery.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable storage medium, and an apparatus of a wireless device are provided. The example apparatus may include a memory and at least one processor coupled to the memory and configured to transmit a sidelink discovery probing message including at least a first identifier of the first sidelink device. The at least one processor coupled to the memory may be further configured to monitor for a probing response from a second sidelink device. The at least one processor coupled to the memory may be further configured to transmit a sidelink discovery message if the first sidelink device receives the probing response from the second sidelink device. The at least one processor coupled to the memory may be further configured to skip transmitting the sidelink discovery message if the first sidelink device does not receive the probing response from the second sidelink device.

The example method may include transmitting a sidelink discovery probing message including at least a first identifier of the first sidelink device. The example method may further include monitoring for a probing response from a second sidelink device. The example method may further include transmitting a sidelink discovery message if the first sidelink device receives the probing response from the second sidelink device. The example method may further include skipping transmitting the sidelink discovery message if the first sidelink device does not receive the probing response from the second sidelink device.

The example non-transitory computer-readable storage medium may store computer executable code, the code when executed by a processor causes the processor to transmit a sidelink discovery probing message including at least a first identifier of the first sidelink device. The code when executed by a processor may further cause the processor to monitor for a probing response from a second sidelink device. The code when executed by a processor may further cause the processor to transmit a sidelink discovery message if the first sidelink device receives the probing response from the second sidelink device. The code when executed by a processor may further cause the processor to skip transmitting the sidelink discovery message if the first sidelink device does not receive the probing response from the second sidelink device.

In another aspect of the disclosure, a method, a non-transitory computer-readable storage medium, and an apparatus of a second wireless device are provided. The example apparatus may include a memory and at least one processor coupled to the memory and configured to receive a sidelink discovery probing message from a first sidelink device, the sidelink discovery probing message identifying the first sidelink device. The at least one processor coupled to the memory may be further configured to transmit a probing response to the first sidelink device responsive to receiving the sidelink discovery probing message. The at least one processor coupled to the memory may be further configured to monitor for a sidelink discovery message from the first sidelink device.

The method may include receiving a sidelink discovery probing message from a first sidelink device, the sidelink discovery probing message identifying the first sidelink device. The method may further include transmitting a probing response to the first sidelink device responsive to receiving the sidelink discovery probing message. The method may further include monitoring for a sidelink discovery message from the first sidelink device.

The example non-transitory computer-readable storage medium may store computer executable code, the code when executed by a processor causes the processor to receive a sidelink discovery probing message from a first sidelink device, the sidelink discovery probing message identifying the first sidelink device. The code when executed by a processor may further cause the processor to transmit a probing response to the first sidelink device responsive to receiving the sidelink discovery probing message. The code when executed by a processor may further cause the processor to monitor for a sidelink discovery message from the first sidelink device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
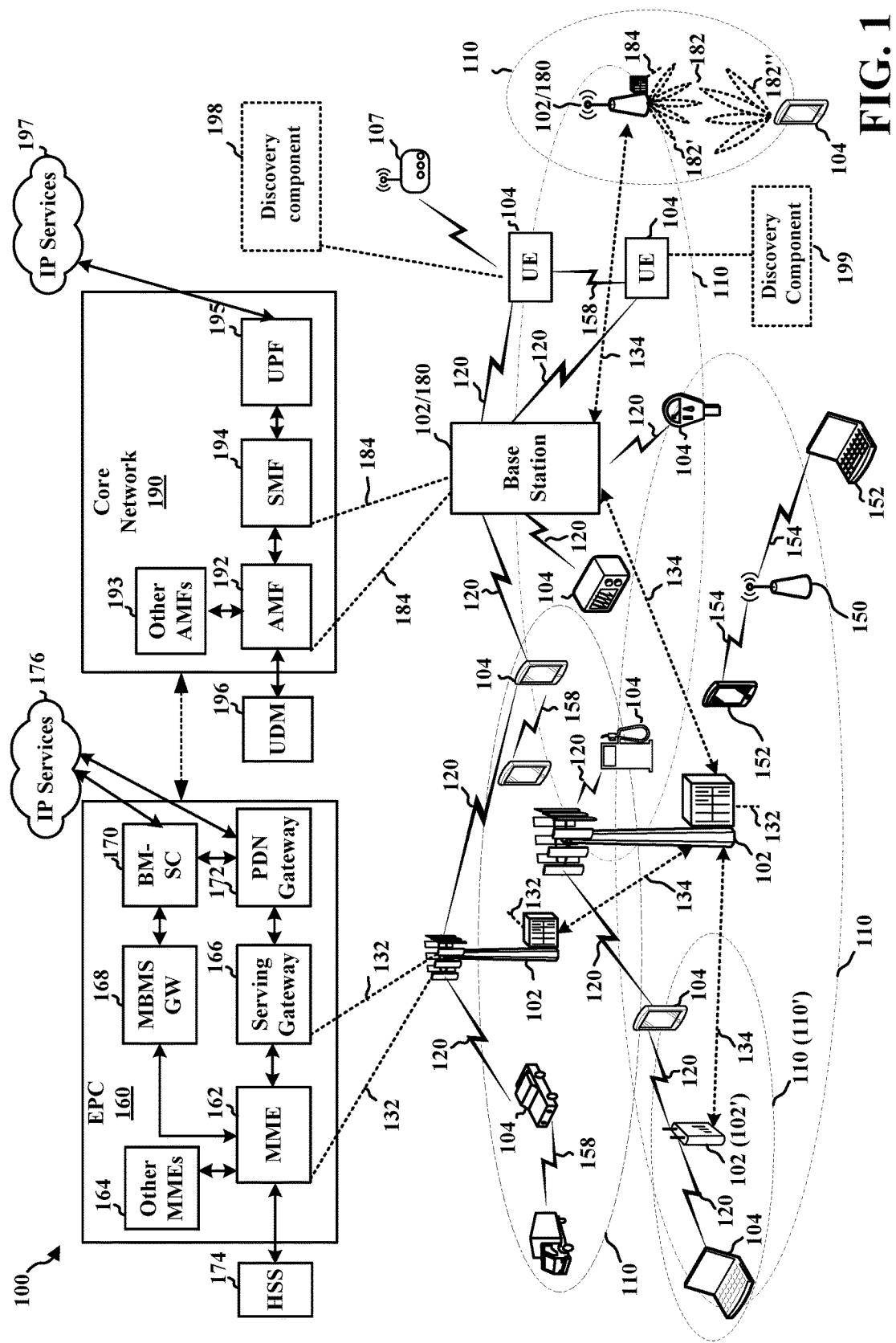
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Some communication may be exchanged directly between wireless devices based on sidelink or a PC5 interface rather than being exchanged between a UE and a base station on an access link or Uu link. One non-limiting example of sidelink communication includes vehicle-to-everything (V2X) communication.

Sidelink communication may include direct wireless communication between a first device (e.g., a first UE or other sidelink device) and a second device (e.g., a second UE or other sidelink device), e.g., without being routed by a base station. In a first mode, a UE may receive a resource allocation for sidelink communication from the base station. The sidelink resource allocation from a base station may be referred to as "resource allocation mode 1" or a "centralized" resource allocation mode, e.g., in which a network entity allocates sidelink resources for multiple sidelink devices. Before exchanging communication, sidelink devices may perform a discovery procedure to discover each other. In some wireless communication systems, such as for communication systems supporting mode 2 resource allocation, the discovery procedure may include a first UE (that may be referred to as an announcing UE) that broadcasts the announcement message that is received by a second UE (that may be referred to as a monitoring UE). The discovery procedure, in which the announcing UE broadcasts an announcement message to one or more monitoring UEs, may be referred as mode A sidelink discovery. In another type of discovery procedure, a first UE (that may be referred to as a discoverer UE) sends a solicitation message including a discovery request and a second UE (that may be referred to as a discoveree UE) may receive the request and send a response message. The discovery procedure, in which the discoverer UE transmits a solicitation message including a discovery request to one or more discoveree UEs, may be referred as mode B sidelink discovery.

Both mode A and mode B sidelink discovery may place a load on the power consumption of a sidelink device. The announcing UE in the mode A discovery procedure and/or the discoverer UE in the mode B discovery procedure sends a discovery messages (either an announcement in mode A or solicitation in mode B), which may include discovery information (for example, UE information such as an identifier, one or more relay service codes identifying one or more connectivity services, an application layer group identifier that identifies an application layer group that the UE belongs to, or other information for facilitating sidelink connection), without knowing whether another UE is nearby and/or similarly performing discovery. Aspects provided herein provide a more efficient discovery process for sidelink communications that enable a sidelink to efficiently discover other sidelink devices using reduced power and reduced wireless resources. In addition, aspects provided herein provide mechanisms for sending discovery messages in a beam-specific manner which may be useful for higher frequency bands.

Aspects presented herein enable a sidelink device to transmit a sidelink discovery probing message that has a reduced size in comparison to an announcement message or a solicitation message. For example, the probing message may include a first identifier of the first sidelink device. The probing message may be sent without including service information that is included in an announcement/solicitation message. The sidelink device may monitor for a probing response from a second sidelink device and may transmit a sidelink discovery message (e.g., announcement/solicitation message) if the first sidelink device receives the probing response from the second sidelink device. In one example, the sidelink device may skip transmitting the sidelink discovery message if the first sidelink device does not receive the probing response from the second sidelink device. The use of the probing message enables the sidelink device to efficiently determine whether or not proceed with transmitting the discovery message (e.g., that may be larger in size than the probing message). In some examples, the sidelink device may transmit the probing message over multiple beams, e.g., in a beam sweep pattern. In one example, the sidelink device may receive the probing response message over a subset of one or more of the multiple beams. Then, in one example, the sidelink device may use the subset of beams to transmit the announcement/solicitation message (e.g., that may be larger in size than the probing message). As the probing message may be smaller in size than an announcement/solicitation message, the UE may transmit the probing message on different beams within a same slot, which may enable the UE to use sidelink resources more efficiently.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

A UE 104, Road Side Unit (RSU) 107, or other sidelink devices may include a discovery component 198 configured to transmit a sidelink discovery probing message comprising at least a first identifier of the first sidelink device. The discovery component 198 may be further configured to monitor for a probing response from a second sidelink device. The discovery component 198 may be further configured to transmit a sidelink discovery message if the first sidelink device receives the probing response from the second sidelink device. The discovery component 198 may be further configured to skip transmitting the sidelink discovery message if the first sidelink device does not receive the probing response from the second sidelink device.

In some aspects, the UE 104, RSU 107, or other sidelink devices may include a discovery component 199 configured to receive a sidelink discovery probing message from a first sidelink device, the sidelink discovery probing message identifying the first sidelink device. The discovery component 199 may be further configured to transmit a probing response to the first sidelink device responsive to receiving the sidelink discovery probing message. The discovery component 199 may be further configured to monitor for a sidelink discovery message from the first sidelink device, The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
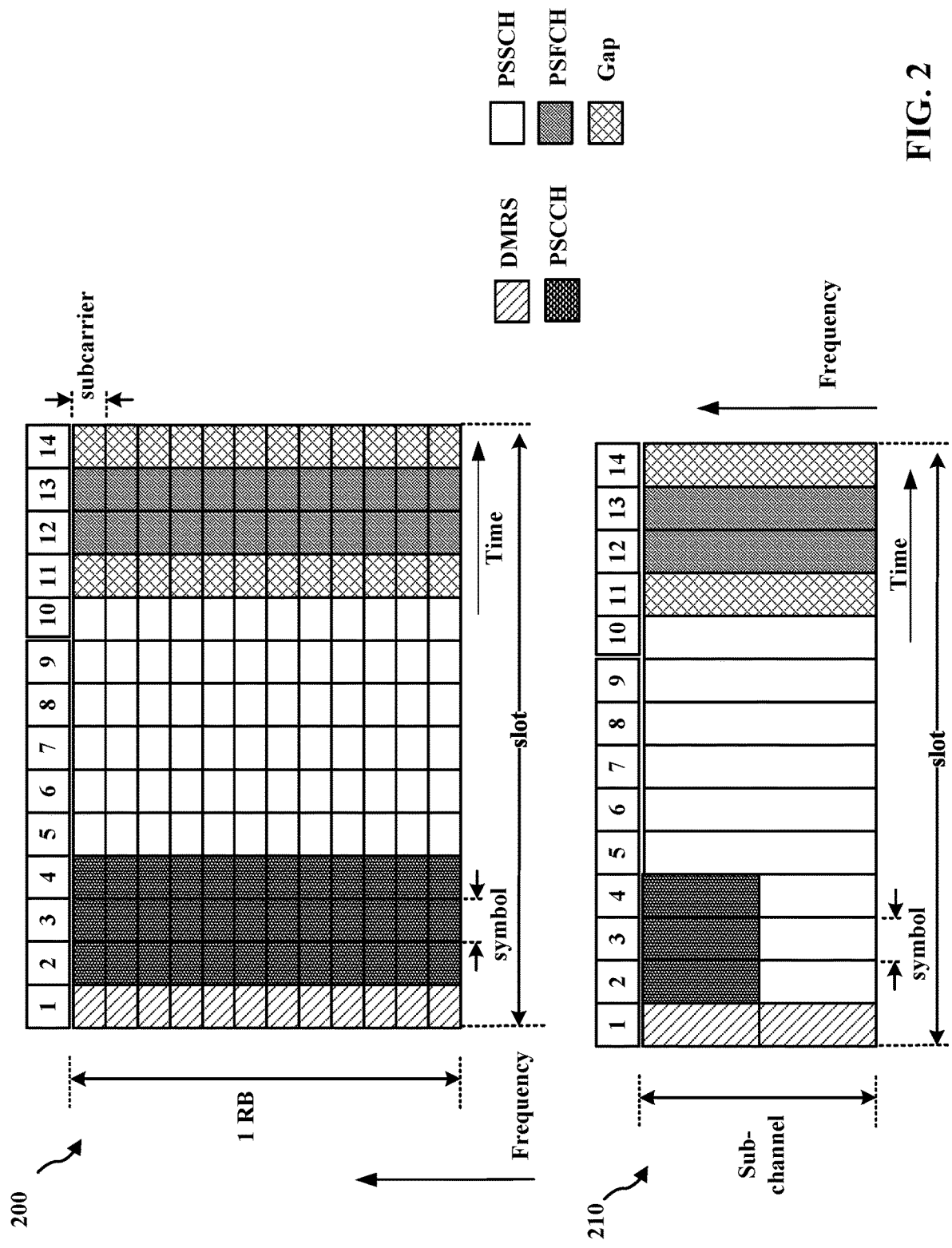
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
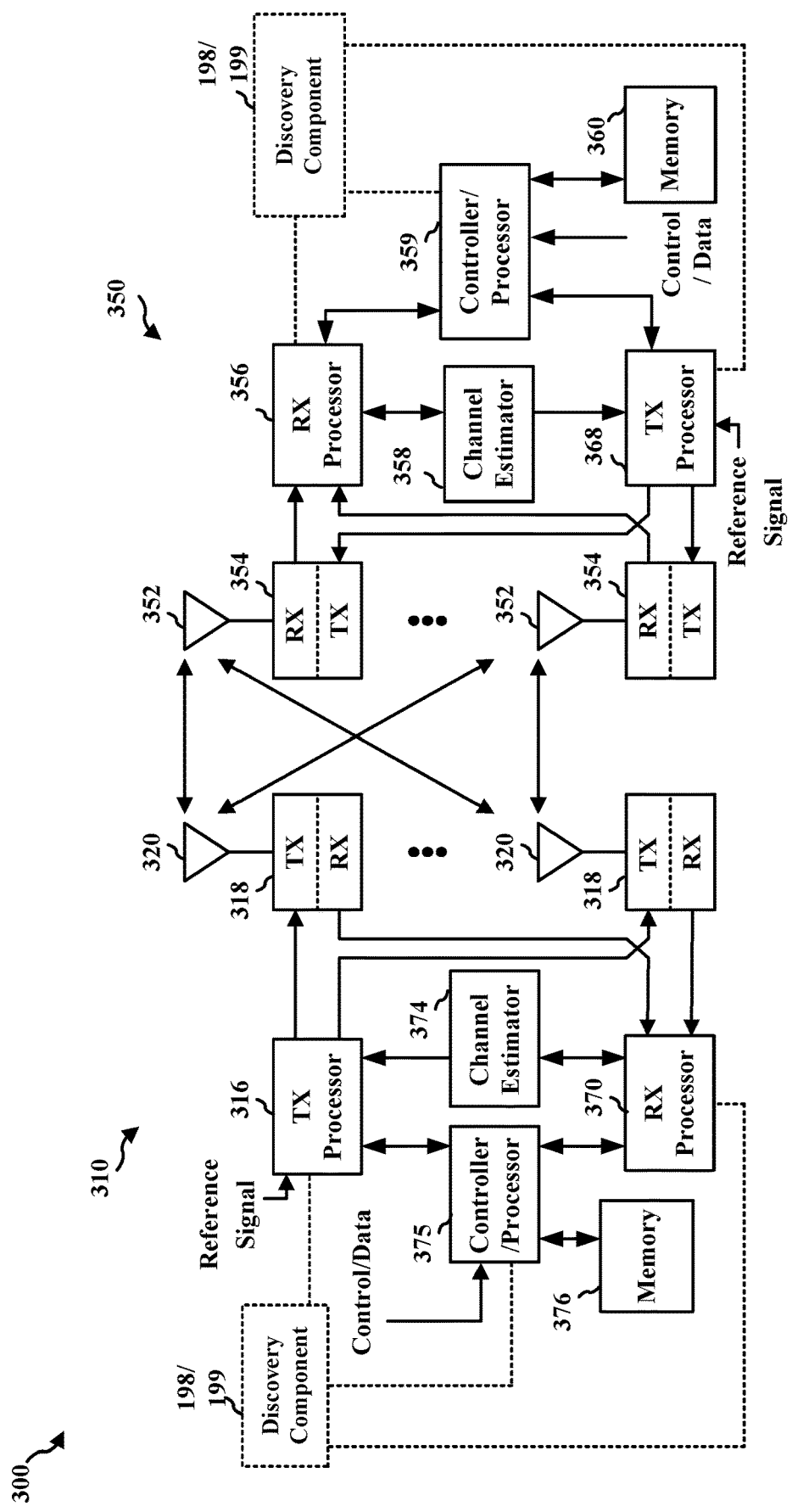
FIG. 3 is a diagram illustrating an example of a base station and user equipment (UE) in an access network.

FIG. 3 is a block diagram 300 of a first wireless communication device 310 in communication with a second wireless communication device 350. In some examples, the devices 310 and 350 may communicate based on V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with discovery component 198/199 of FIG. 1.

Some communication may be exchanged directly between wireless devices based on sidelink or a PC5 interface rather than being exchanged between a UE and a base station on an access link or Uu link. One non-limiting example of sidelink communication includes vehicle-to-everything (V2X) communication.

Figures 4A, 4B:
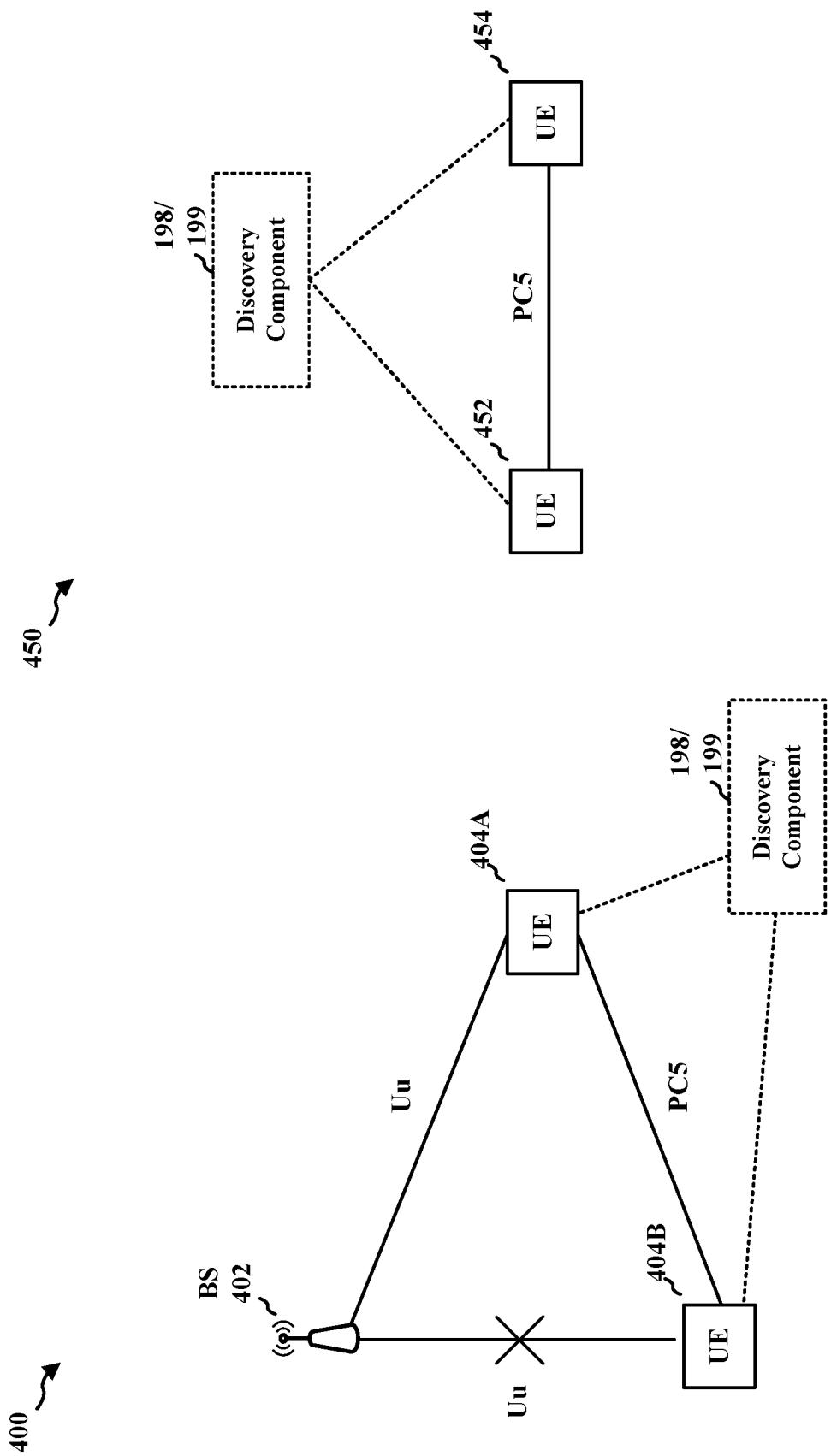
FIGS. 4A and 4B illustrate example sidelink communications.

Sidelink communication may include direct wireless communication between a first device (e.g., a first UE or other sidelink device) and a second device (e.g., a second UE or other sidelink device), e.g., without being routed by a base station. In a first mode, a UE may receive a resource allocation for sidelink communication from the base station. The sidelink resource allocation from a base station may be referred to as "resource allocation mode 1" or a "centralized" resource allocation mode, e.g., in which a network entity allocates sidelink resources for multiple sidelink devices. For example, as illustrated in example 400 in FIG. 4A, a base station 402 may be in communication with a UE 404A via a Uu link and may be unable to communicate with a UE 404B via Uu link. The UE 404A may be in communication with the UE 404B via a PC5 link to facilitate communications for the UE 404B. In some aspects, the base station 404 may determine the resource allocation for the sidelink communication, which may be referred to as mode 1 resource allocation or centralized sidelink resource allocation.

In a second resource allocation mode, a UE may autonomously determine resources for sidelink transmissions by sensing for reservations of other sidelink devices. The autonomous resource selection may be referred to as "resource allocation mode 2," a "decentralized" resource allocation mode, or a sensing based sidelink resource allocation mode, e.g., where each sidelink device selects its own sidelink resources for sidelink transmissions. Thus, rather than receiving an allocation of sidelink resources (e.g., as in resource allocation mode 1), in resource allocation mode 2 (e.g., sensing based sidelink resource allocation) the wireless device may determine the sidelink transmission resource(s) based on a sensing and resource reservation procedure. For example, the UE may perform sensing by monitoring for SCI indicating resources that the other UEs use or reserve for transmitting sidelink transmissions. The SCI indicating resources may be described as reserving the sidelink resources. The indicated resources may be referred to as a sidelink resource reservation. For example, the UE may determine the resource allocations without a resource allocation from a base station or central, network entity.

The UE 404A and the UE 404B may include the discovery component 198/199. As illustrated in example 450 in FIG. 4B, in some aspects, a UE 452 and a UE 454, which may both include the discovery component 198/199, may connect with each other without resources allocated by a base station.

Figure 5:
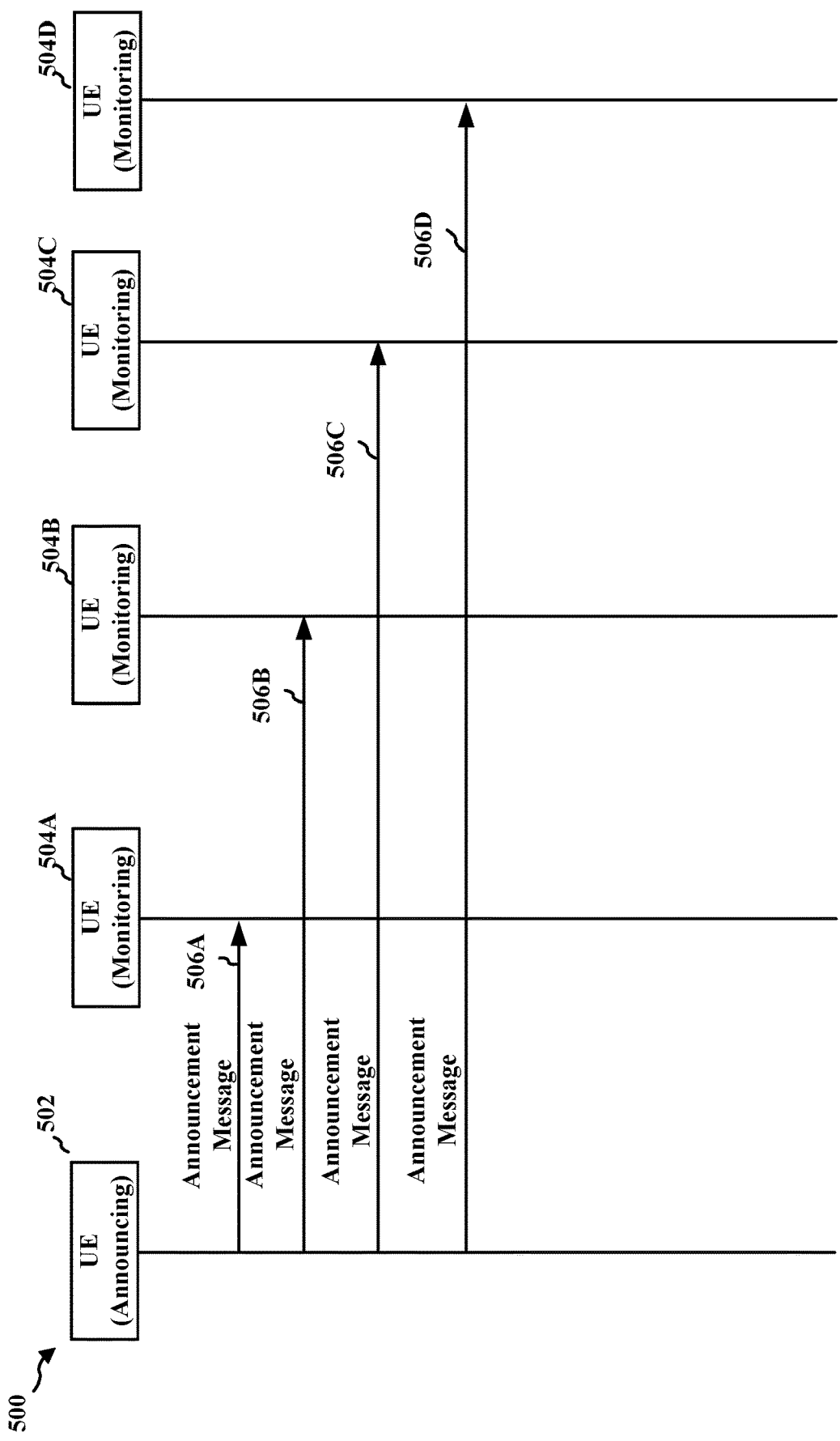
FIG. 5 illustrates an example mode A sidelink communication.

In order to exchange sidelink communication, the sidelink devices may perform a discovery procedure, such as described in connection with FIGS. 5 and 6. The discovery procedure may include monitoring for discovery signals from another sidelink device. For example, in one type of sidelink discovery model, a first UE (e.g., an announcing UE) may broadcast/groupcast a discovery message indicating its presence as a sidelink device to other UEs. In response, other UEs who received the discovery message may transmit a connection request message to the first UE to establish a sidelink communication with the first UE. An example of the first type of sidelink discovery procedure is illustrated in FIG. 5.

Figure 6:
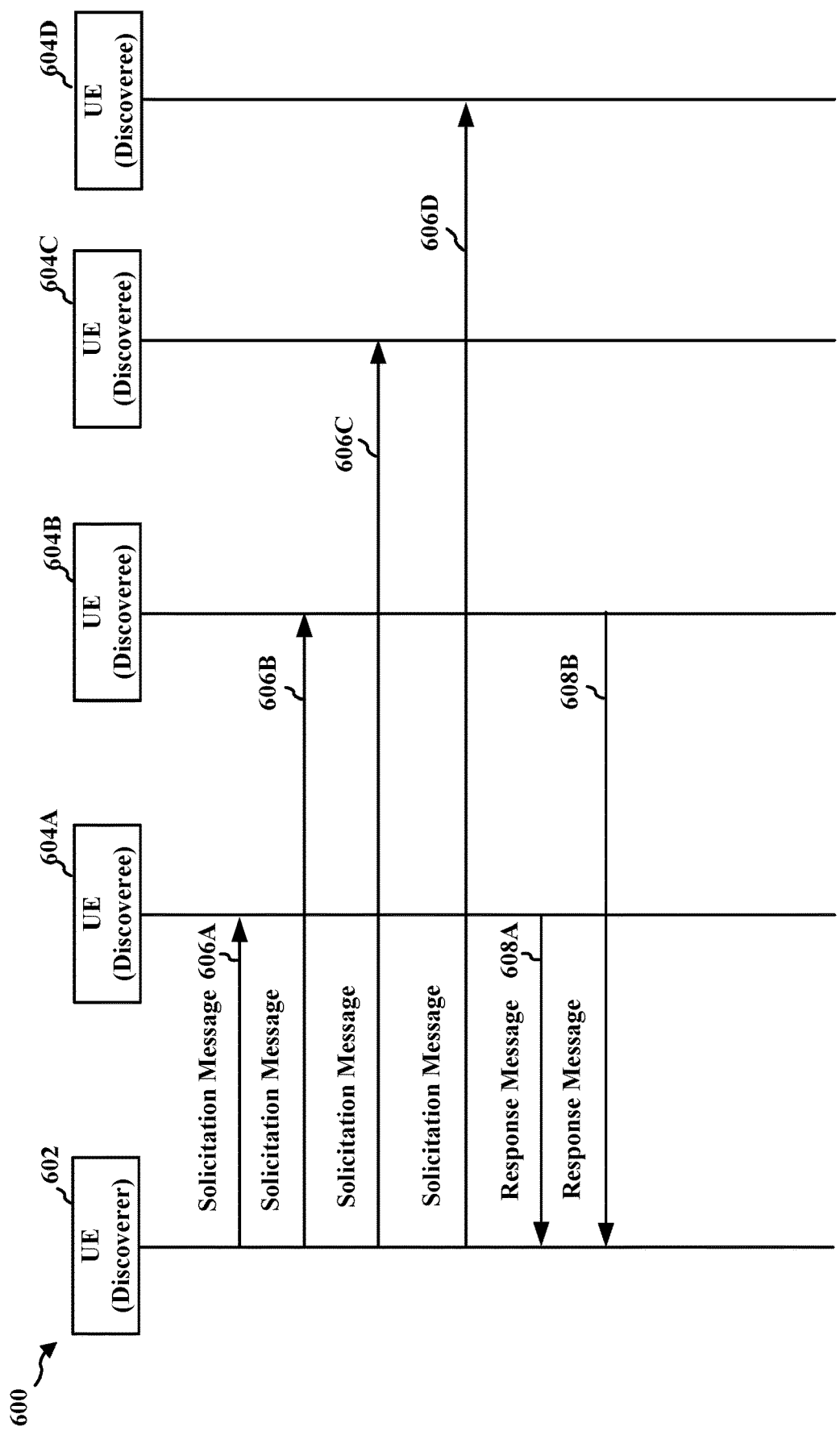
FIG. 6 illustrates an example mode B sidelink communication.

A second type of discovery procedure is illustrated in FIG. 6, in which a first UE 602 (e.g., a discoverer UE) may broadcast a solicitation message 606A to other UEs. In response, other UEs who received the solicitation message may process the request and transmit a response message to the first UE 602. Monitoring for discovery signals and/or sidelink reservation messages may consume power at a sidelink device.

To establish sidelink communication between sidelink devices (e.g., UEs), one sidelink device may attempt to discover another sidelink device via a discovery procedure at the higher layer (e.g., application) of the protocol stack. The discovery mechanism may also be configured at lower layer of the protocol stack. In one type of sidelink discovery model, as shown by diagram 500 of FIG. 5, to determine the presence of another UE, a first UE 502 may broadcast/groupcast a discovery message. The discovery message may be an announcement message 506A. The first UE 502 may broadcast the announcement message 506A indicating its presence as a sidelink device to other UEs (e.g., UE(s) 504A, 504B, 504C, 504D) within a transmission range of the first UE 502. For example, the UE 502 may broadcast an announcement message that may be received by the UEs 504A-D, and other sidelink devices within the transmission range of the UE. A sidelink UE, such as UE 504A, that receives the announcement message 506A may respond with a message 508 (e.g., a connection request) to the first UE, e.g., UE 502. After discovering each other, the UEs 502 and 504A may exchange sidelink communication. The first sidelink device or the first UE 502 transmitting the announcement message (e.g., announcement message(s) 506A-D) may be referred to as an announcing UE. The wireless device(s) (e.g., UEs 504A-D) transmitting the discovery response 508 or monitoring for the announcement message may be referred to as a monitoring UE. The type of discovery involving a broadcast announcement and reply may be referred to as a first model of discovery, or "Model A" sidelink discovery.

In another type of sidelink discovery model, as shown by diagram 600 of FIG. 6, a first UE 602 may broadcast a solicitation message 606A-D (which may also be referred to as a "discovery request message") to one or more UE(s) 604A, 604B, 604C, 604D. The first UE 602 transmitting the solicitation message 606A-D may be referred to as a discoverer UE. In response, the UE(s) 604A-D receiving the solicitation message 606A-D may process the request and transmit a response message 608A or 608B to the first UE 602. The UE(s) transmitting the response message 608A or 608B may be referred to as a discoveree UE. The type of discovery including a solicitation message or a discovery request message may be referred to as a second type of discovery or "Model B" sidelink discovery. As an example, in Model A sidelink discovery, the announcement message informs other sidelink UEs "I am here," whereas in Model B sidelink discovery, the solicitation message or the discovery request asks "Who is there?" or "Are you there?" to nearby sidelink devices. Announcement message and solicitation message may be referred to as "sidelink discovery message."

The continuous transmission and/or monitoring of discovery-related messages may increase the power consumption at the receiving sidelink device and/or at the transmitting sidelink device, which may also reduce their performance. The announcing UE in mode A or the discoverer UE in mode B sends a discovery messages (e.g., announcement in mode A or solicitation in mode B), which may include a large amount of data (e.g., including information about services offered or solicited) and may be power consuming to transmit. The transmitting UE may transmit the discovery messages without knowing whether another UE is within range or is interested in being discovered. Aspects provided herein provide a more efficient discovery process for sidelink communications based on the transmission of a smaller discovery probe prior to the transmission of larger discovery messages. The transmission of the discovery probe may be less power consuming than the transmission of the other discovery messages, which may improve power efficiency. In addition, aspects provided herein provide mechanisms for sending discovery messages in a beam-specific manner by enabling beam sweeping for the discovery step, which may be particularly useful for higher frequency bands, such as FR2 or above. In some aspects, a beam may be equivalent to/correspond with a spatial filter, for example, a transmit beam may be equivalent to a spatial transmit filter and a receive beam may be equivalent to a spatial receive filter.

Figure 7:
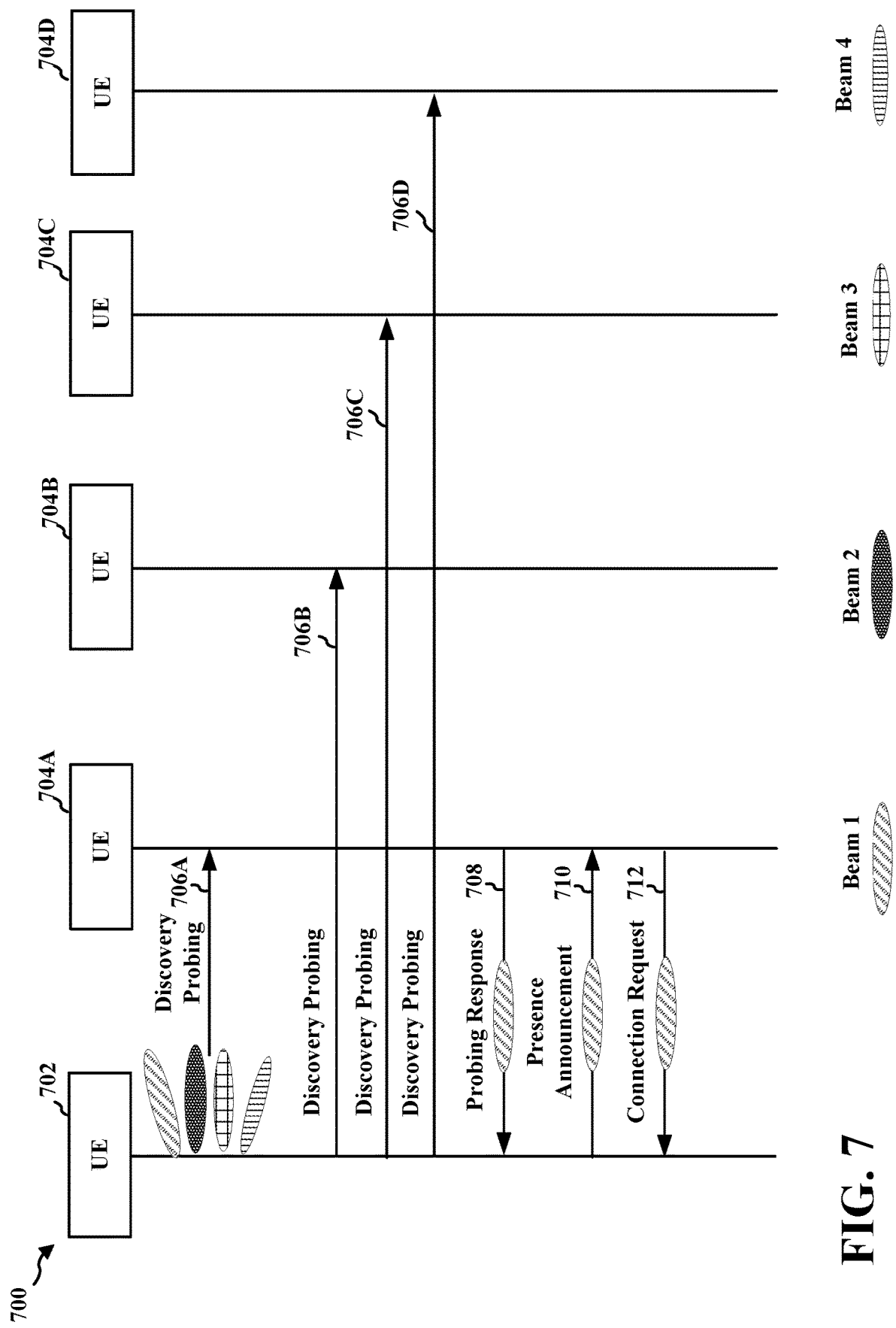
FIG. 7 illustrates an example mode A sidelink communication with discovery, in accordance with various aspects of the present disclosure.

FIG. 7 illustrates an example mode A sidelink communication 700 with discovery. As illustrated in FIG. 7, a UE 702 may transmit a discovery probing 706A, 706B, 706C, and 706D to one or more UEs 704A, 704B, 704C, and 704D. A "discovery probing" is a transmission for initiating sidelink connections. The discovery probing 706A, 706B, 706C, and 706D may carry ID and beam information (such as beam information from beam combination codebook, SSBs, beam index, or other information) of the UE 702. In some aspects, the discovery probing may only carry ID and beam information. In some aspects, the discovery probing 706A, 706B, 706C, and 706D may be transmitted via multiple beams and may carry beam information of the multiple beams, such as beams 1, 2, 3, and 4. The discovery probing 706A, 706B, 706C, and 706D may be unicasted, group-casted, or broadcasted. In some aspects, the discovery probing 706A, 706B, 706C, and 706D may be sequence-based (e.g., carried by or indicated by a sequence). In some aspects, the discovery probing 706A, 706B, 706C, and 706D may be sidelink control information (SCI)-based (e.g., carried in SCI). In some aspects, the discovery probing 706A, 706B, 706C, and 706D may be periodic. In some aspects, the discovery probing may be for a radio resource management (RRM) procedure.

Responsive to receiving the discovery probing, one of the UEs 704A, 704B, 704C, and 704D may respond with a probing response 708 to facilitate sidelink connection. A "probing response" is a transmission that is responsive to a discovery probing for facilitating sidelink connections. In some aspects, the probing response 708 may be transmitted on a subset of the multiple beams, such as on one beam (or two) of the multiple beams, such as beam 1. In some aspects, the probing response 708 may carry ID and beam information of the UE 702 and the UE 704A. In some aspects, beam information is explicitly indicated in the content of probing response message. In some aspects, beam information is implicitly indicated in the mapping between resource for discovery probing and resource for probing response. In some aspects, the probing response may include info for one beam or more than one beam.

After receiving the probing response 708, the UE 702 may transmit a discovery message, such as a presence announcement message 710 to the UE 704A using the subset of beams (e.g., beam 1) and may receive a connection request 712 using the subset of beams (e.g., beam 1) to facilitate the sidelink connection between the UE 702 and the UE 704A. In some aspects, if there is no probing response 708, the UE 702 will not transmit the presence announcement message 710 (which may be relatively more power-consuming to transmit than the discovery probing 706A/B/C/D). Thus, the probing message not only enables the UE 702 to determine that another UE is available for discovery, but also enables the UE 702 to select a beam, or a subset of beams, to use for the discovery procedure with the other UE. As well, as the probing message 706A is smaller than a discovery message 710, the UE may transmit the probing message on multiple beams, e.g., in a beam sweep pattern, within a single slot. This enables the UE to more efficiently determine a beam to use with the UE 704A.

Figure 8:
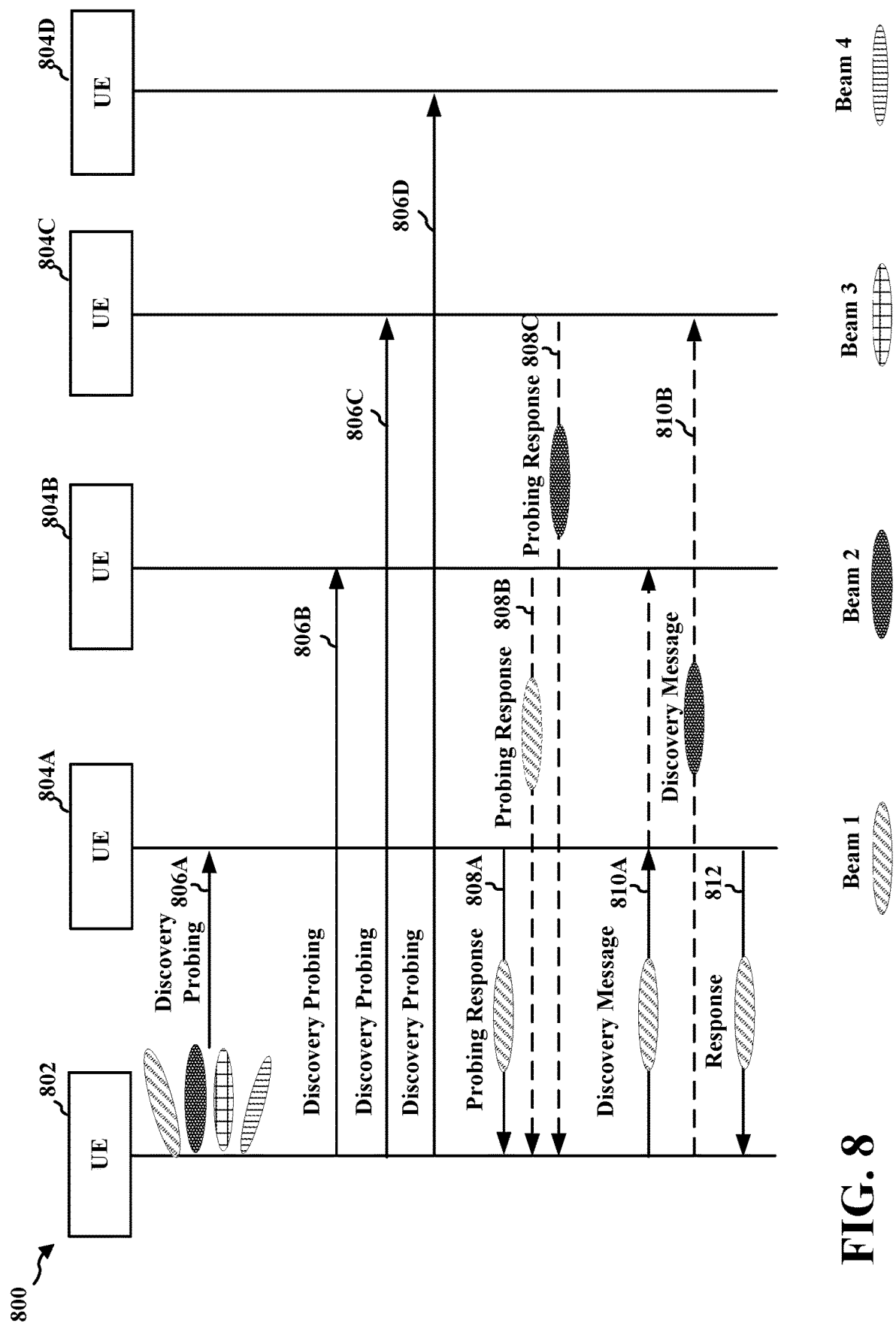
FIG. 8 illustrates an example mode B sidelink communication with discovery, in accordance with various aspects of the present disclosure.

FIG. 8 illustrates an example of mode A sidelink discovery 800. As illustrated in FIG. 8, a UE 802 may transmit a discovery probing 806A, 806B, 806C, and 806D to one or more UEs 804A, 804B, 804C, and 804D. The discovery probing 806A, 806B, 806C, and 806D may carry ID and beam information of the UE 802. In some aspects, the discovery probing 806A, 806B, 806C, and 806D may be transmitted via multiple beams and carries beam information of the multiple beams, such as beams 1, 2, 3, and 4. The discovery probing 806A, 806B, 806C, and 806D may be unicasted, group-casted, or broadcasted. In some aspects, the discovery probing 806A, 806B, 806C, and 806D may be sequence-based (e.g., carried by a sequence). In some aspects, the discovery probing 806A, 806B, 806C, and 806D may be sidelink control information (SCI)-based (e.g., carried by SCI). In some aspects, the discovery probing 806A, 806B, 806C, and 806D may be aperiodic.

Responsive to receiving the discovery probing, one or more of the UEs 804A, 804B, 804C, and 804D may respond with a probing response 808A, 808B, and 808C to facilitate sidelink connection. In some aspects, the probing response 808A, 808B, and 808C may be transmitted on different beams of the multiple beams, such as beam 1 and beam 2. In some aspects, the probing response 808A, 808B, and 808C may carry ID and beam information of the UE 802 and the responding UE 804A, 804B, or 804C. In some aspects, beam information is explicitly indicated in the content of probing response message. In some aspects, beam information is implicitly indicated in the mapping between resource for discovery probing and resource for probing response. In some aspects, the probing response may include info for one beam or more than one beam.

After receiving the probing response 808A, 808B, and 808C, the UE 802 may transmit a discovery message 810A to the UE 804A and another discovery message 810B to the UE 804B. The UE 802 may receive a response 812 to facilitate the sidelink connection between the UE 802 and the UE 804A. In some aspects, if there is no probing response, the UE 802 will not transmit the discovery message 810A/810B (which may be relatively more power-consuming to transmit than the discovery probing 806A/B/C/D). As with FIG. 7, the probing message 806A-D not only enables the UE 802 to determine that another UE is available for discovery, but also enables the UE 802 to select a beam, or a subset of beams, to use for the discovery procedure with the other UE. As well, as the probing message 806A-D is smaller than a discovery message 810A, the UE 802 may transmit the probing message 806A-D on multiple beams, e.g., in a beam sweep pattern, within a single slot. This enables the UE 802 to more efficiently determine a beam to use with the UE 804A and 804C.

Figure 9:
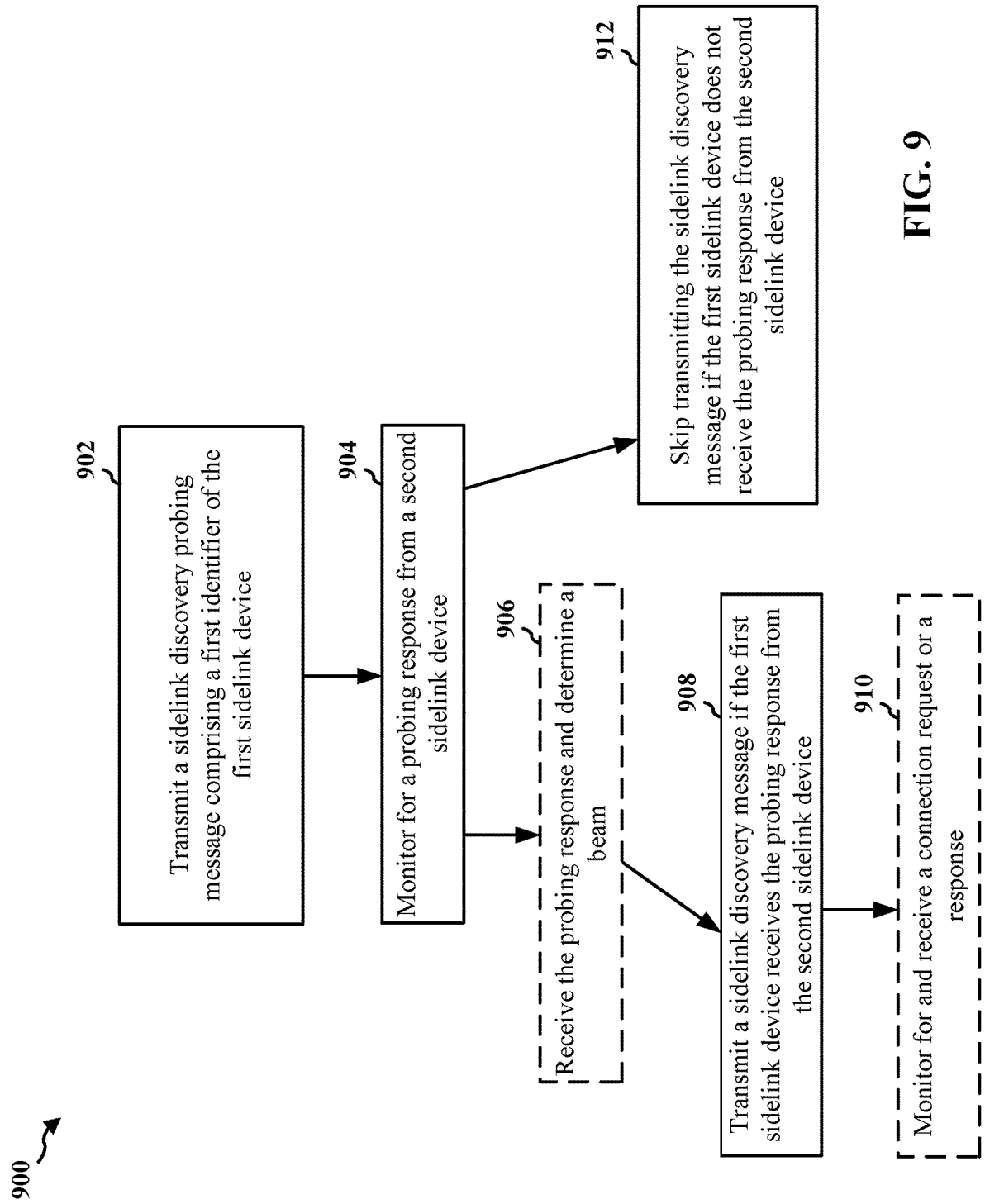
FIG. 9 is a flowchart of a method of wireless communication.

FIG. 9 is a flowchart 900 of a method of wireless communication. The method may be performed by a first sidelink device (e.g., the UE 104, the UE 702, the UE 802, the apparatus 1102). Optional aspects are illustrated with a dashed line. The method enables a more power-efficient discovery process for sidelink communications and enables support for beam sweeping in the discovery process for sidelink communications.

At 902, the sidelink device transmits a sidelink discovery probing message including at least a first identifier of the first sidelink device. For example, transmission 902 may be performed by probing component 1142 of FIG. 11. In some aspects, the first sidelink device transmits the sidelink discovery probing message via multiple beams as described in connection with FIGS. 7 and 8. In some aspects, the sidelink device periodically transmits the discovery probing message. In some aspects, the sidelink device aperiodically transmits the discovery probing message. In some aspects, the sidelink device may determine an occurrence of an aperiodic trigger for the sidelink discovery probing message and the transmission at 902 may be in response to the trigger. In some aspects, the aperiodic trigger is based on a beam refinement procedure. In some aspects, the sidelink device may perform an RRM procedure that includes the transmission of the sidelink discovery probing message at 902.

At 904, the sidelink device monitors for a probing response from a second sidelink device. For example, transmission 904 may be performed by monitoring component 1144 of FIG. 11.

At 906, the sidelink device receives the probing response on a beam and determines a beam based on a resource of the probing response. For example, reception 906 may be performed by probing response reception component 1146 of FIG. 11. In some aspects, the probing response includes beam information for at least one beam. The probing response may include beam information for the beam on which the probing response was received. In some aspects, the probing response may include beam information for multiple beams, and the multiple beams may include the beam on which the probing response was received. In some aspects, the multiple beams do not include the beam on which the probing response was received. In some aspects, a beam on which the probing message is transmitted may be the same as a beam on which the probing response is received or a beam on which the probing message is transmitted may be associated with a corresponding reception beam on which the probing response is received. In some aspects, a beam on which the probing message is transmitted may not be the same as a beam on which the probing response is received or a beam on which the probing message is transmitted may not be associated with a corresponding reception beam on which the probing response is received. In some aspects, the first sidelink device transmits the sidelink discovery message to the second sidelink device on the at least one beam indicated in the beam information. In some aspects, the sidelink device determines a beam based on a resource of the probing response. In some aspects, the UE may use a mapping between the discovery probing resource and the probing response resource to implicitly determine the beam. In some aspects, the probing response comprises the first identifier for the first sidelink device, a second identifier of the second sidelink device, and information for the at least one beam. In some aspects, the first sidelink device receives the probing response on a single beam, the probing response including information for multiple beams. In some aspects, transmitting sidelink discovery probing message may include transmitting the sidelink discovery probing message via a sequence. For example, the sequence may be one or more of an m-sequence, a Gold sequence, a Zadoff-Chu sequence, or the like. In some aspects, the sidelink discovery probing message may be transmitted in SCI. In some aspects, transmitting the sidelink discovery probing message may include unicasting the sidelink discovery probing message, broadcasting the sidelink discovery probing message, or groupcasting the sidelink discovery probing message.

At 908, the sidelink device transmits a sidelink discovery message if the first sidelink device receives the probing response from the second sidelink device. For example, transmission 908 may be performed by announcement component 1148 of FIG. 11. In some aspects, the first sidelink device corresponds to an announcing UE such as the UE 702, and the sidelink discovery message comprises a presence announcement message. In some aspects, the first sidelink device corresponds to a discoverer UE such as the UE 802, and the sidelink discovery message includes a solicitation message. In some aspects, the probing response indicating a duration of time during which the second sidelink device is available, and the first sidelink device transmits the sidelink discovery message to the second sidelink device during the duration of time.

At 910, the sidelink device monitors for and receives a connection request or a response. For example, reception 910 may be performed by announcement response processing component 1150 of FIG. 11. In some aspects, the sidelink device may transmit the sidelink discovery probing message on multiple beams and may receive the probing response from the second sidelink device on a beam (and/or a subset of beams that includes more than one of the multiple beams). In some aspects, the first sidelink device transmits the presence announcement message to the second sidelink device on the beam on which the probing response was received. In some aspects, the first sidelink device monitors for a connection request from the second sidelink device on the beam on which the probing response was received. In some aspects, the first sidelink device may monitor, on the beam on which the probing response was received, for a response message from the second sidelink device in response to the solicitation message from the second sidelink device.

At 912, the sidelink device skips transmitting the sidelink discovery message if the first sidelink device does not receive the probing response from the second sidelink device. For example, skipping 912 may be performed by skipping component 1152 of FIG. 11.

Figure 10:
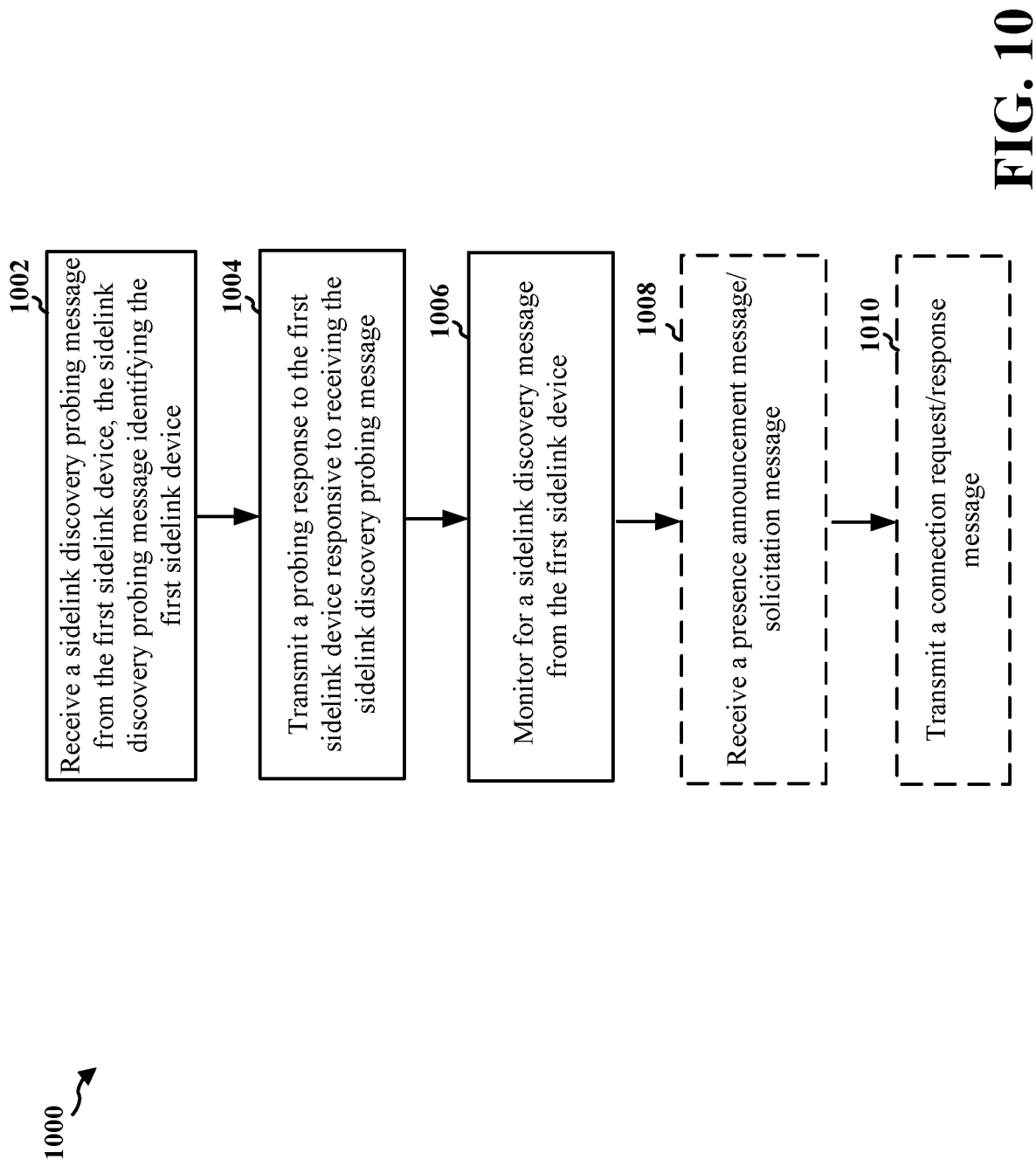
FIG. 10 is a flowchart of a method of wireless communication.

FIG. 10 is a flowchart 1000 of a method of wireless communication. The method may be performed by a second sidelink device (e.g., the UE 104, the UE 704A/B/C/D, the UE 804 A/B/C/D, the apparatus 1202). Optional aspects are illustrated with a dashed line. The method enables a more power-efficient discovery process for sidelink communications and enables support for beam sweeping in the discovery process for sidelink communications.

At 1002, the second sidelink device receives a sidelink discovery probing message from a first sidelink device, the sidelink discovery probing message identifying the first sidelink device. In some aspects, the sidelink discovery probing message further includes a beam indication corresponding to one of multiple beams. The sidelink device may use the at least one beam indicated in the beam information to monitor for the sidelink discovery message from the first sidelink device. For example, reception 1002 may be performed by probing reception component 1242 of FIG. 12.

At 1004, the second sidelink device transmits a probing response to the first sidelink device responsive to receiving the sidelink discovery probing message. For example, transmission 1004 may be performed by probing response component 1244 of FIG. 12. In some aspects, the second sidelink device transmits the probing response using a resource associated with a beam. The second sidelink device may use the beam to monitor for the sidelink discovery message from the first sidelink device based on a mapping (e.g., between the resources associated with the probing response and the discovery probing). In some aspects, the second sidelink device transmits, in the probing response, information regarding a duration of time during which the sidelink device is available for discovery. In some aspects, the second sidelink device transmits the probing response on a single beam, the probing response including information for multiple beams. In some aspects, the probing response comprises a first ID for the first sidelink device, a second ID of the second sidelink device, and the beam indication for at least one beam.

At 1006, the second sidelink device monitors for a sidelink discovery message from the first sidelink device. For example, monitoring 1006 may be performed by monitoring component 1246 of FIG. 12.

In some aspects, the sidelink discovery message includes a presence announcement message from an announcing sidelink device (that may be the first sidelink device and/or a different sidelink device). In some aspects, the sidelink discovery message includes a solicitation message from a discoverer sidelink device (that may be the first sidelink device and/or a different sidelink device). At 1008, the second sidelink device receives the presence announcement message from the announcing sidelink device or the solicitation message from the discoverer sidelink device. For example, reception 1008 may be performed by announcement reception component 1248 of FIG. 12.

At 1010, the second sidelink device transmits a connection request to the announcing sidelink device or transmits a response to the solicitation message. For example, transmission 1010 may be performed by announcement response component 1250 of FIG. 12.

Figure 11:
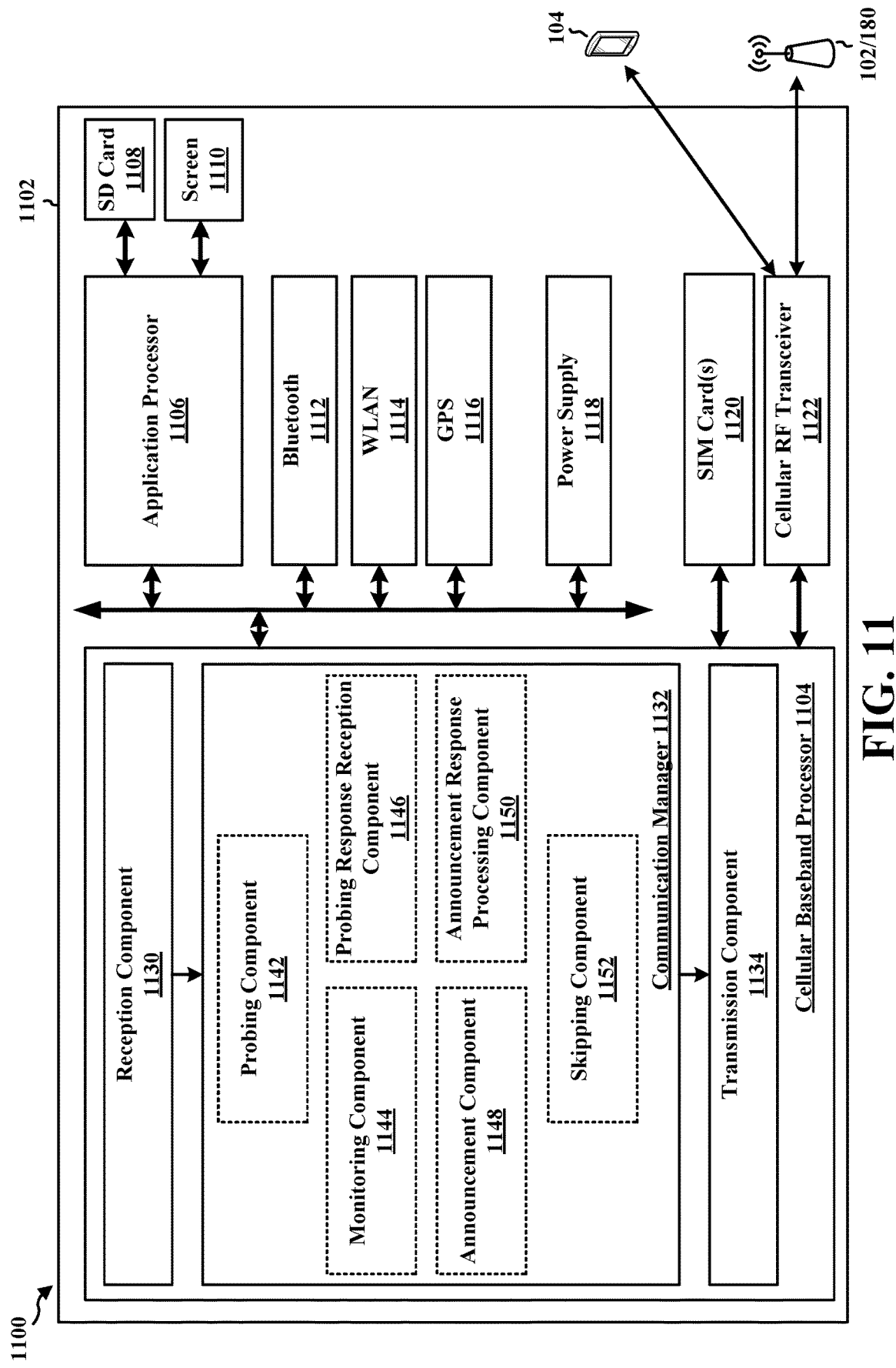
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a probing component 1142 that transmits a sidelink discovery probing message including at least a first identifier of the first sidelink device, e.g., as described in connection with 902 of FIG. 9. The communication manager 1132 further includes a monitoring component 1144 that monitors for a probing response from a second sidelink device, e.g., as described in connection with 904 of FIG. 9. The communication manager 1132 further includes a probing response reception component 1146 that receives the probing response and determines a beam, e.g., as described in connection with 906 of FIG. 9. The communication manager 1132 further includes an announcement component 1148 that transmits a sidelink discovery message if the first sidelink device receives the probing response from the second sidelink device, e.g., as described in connection with 908 of FIG. 9. The communication manager 1132 further includes an announcement response processing component 1150 that monitors for and receives a connection request or a response, e.g., as described in connection with 910 of FIG. 9. The communication manager 1132 further includes a skipping component 1152 that skips transmitting the sidelink discovery message if the first sidelink device does not receive the probing response from the second sidelink device, e.g., as described in connection with 912 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband cellular processor 1104, includes means for transmitting a sidelink discovery probing message comprising at least a first identifier of the first sidelink device (e.g., the probing component 1142 and/or a transceiver). The baseband cellular processor 1104 may further include means for monitoring for a probing response from a second sidelink device (e.g., the monitoring component 1144 and/or a transceiver). The baseband cellular processor 1104 may further include means for receiving the probing response (e.g., the probing response reception component 1146 and/or a transceiver). The baseband cellular processor 1104 may further include means for transmitting a sidelink discovery message if the first sidelink device receives the probing response from the second sidelink device (e.g., the announcement component 1148 and/or a transceiver). The baseband cellular processor 1104 may further include means for determining a beam based on a resource of the probing response (e.g., the probing component 1142 and/or a transceiver). The baseband cellular processor 1104 may further include means for monitoring, on the beam on which the probing response was received, for a response message from the second sidelink device in response to the solicitation message from the second sidelink device (e.g., the monitoring component 1144, the announcement response processing component 1150 and/or a transceiver). The baseband cellular processor 1104 may further include means for monitoring for a connection request from the second sidelink device on the beam on the beam on which the probing response was received (e.g., the monitoring component 1144, the announcement response processing component 1150 and/or a transceiver).

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
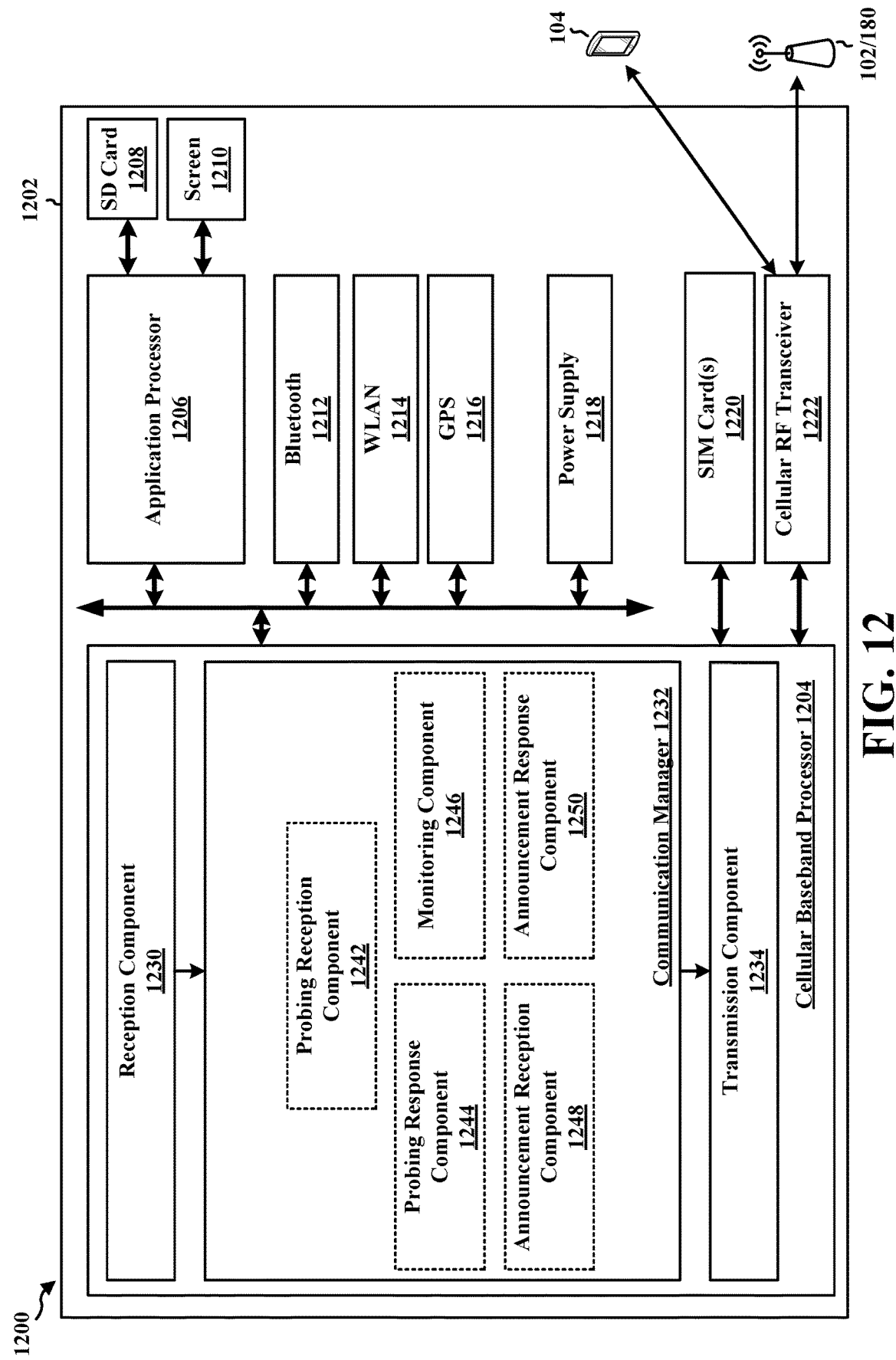
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a probing reception component 1242 that receives a sidelink discovery probing message from a first sidelink device, the sidelink discovery probing message identifying the first sidelink device, e.g., as described in connection with 1002 of FIG. 10. The communication manager 1232 further includes a probing response component 1244 that transmits a probing response to the first sidelink device responsive to receiving the sidelink discovery probing message, e.g., as described in connection with 1004 of FIG. 10. The communication manager 1232 further includes a monitoring component 1246 that monitors for a sidelink discovery message from the first sidelink device, e.g., as described in connection with 1006 of FIG. 10. The communication manager 1232 further includes an announcement reception component 1248 that receives the presence announcement message or the solicitation message, e.g., as described in connection with 1008 of FIG. 10. The communication manager 1232 further includes an announcement response component 1250 that transmits a connection request or a response, e.g., as described in connection with 1010 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband cellular processor 1204, includes means for receiving a sidelink discovery probing message from a first sidelink device, the sidelink discovery probing message identifying the first sidelink device (e.g., the probing reception component 1242 and/or a transceiver). The baseband cellular processor 1204 may further include means for transmitting a probing response to the first sidelink device responsive to receiving the sidelink discovery probing message (e.g., the probing response component 1244 and/or a transceiver). The baseband cellular processor 1204 may further include means for monitoring for a sidelink discovery message from the first sidelink device (e.g., the monitoring component 1246 and/or a transceiver). The baseband cellular processor 1204 may further include means for receiving the presence announcement message or the solicitation message (e.g., the announcement reception component 1248 and/or a transceiver). The baseband cellular processor 1204 may further include means for transmitting a connection request or a response (e.g., the announcement response component 1250 and/or a transceiver).

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first sidelink device, comprising: transmitting a sidelink discovery probing message comprising at least a first identifier of the first sidelink device; monitoring for a probing response from a second sidelink device; transmitting a sidelink discovery message if the first sidelink device receives the probing response from the second sidelink device; and skipping transmitting the sidelink discovery message if the first sidelink device does not receive the probing response from the second sidelink device.

Aspect 2 is the method of aspect 1, wherein the first sidelink device transmits the sidelink discovery probing message via multiple beams.

Aspect 3 is the method of any of aspects 1 to 2, the method further comprising: receiving the probing response on a beam, the probing response comprising beam information for at least one beam, wherein the first sidelink device transmits the sidelink discovery message to the second sidelink device on the at least one beam indicated in the beam information.

Aspect 4 is the method of any of aspects 1 to 3, the method further comprising: receiving the probing response; and determining a beam based on a resource of the probing response, wherein the first sidelink device transmits the sidelink discovery message to the second sidelink device on the beam associated with the resource of the probing response.

Aspect 5 is the method of any of aspects 1 to 4, further comprising: receiving the probing response on at least one beam wherein the probing response comprises the first identifier for the first sidelink device, a second identifier of the second sidelink device, and information for the at least one beam.

Aspect 6 the method of any of aspects 1 to 5, wherein the first sidelink device receives the probing response on a single beam, the probing response including information for multiple beams.

Aspect 7 is the method of any of aspects 1 to 6, wherein the transmitting the sidelink discovery probing message further comprises: transmitting the sidelink discovery probing message via a sequence.

Aspect 8 is the method of any of aspects 1 to 7, wherein the sequence is one of: an m-sequence, a Gold sequence, or a Zadoff-Chu sequence.

Aspect 9 is the method of any of aspects 1 to 6, wherein the transmitting the sidelink discovery probing message further comprises: transmitting the sidelink discovery probing message in SCI.

Aspect 10 is the method of any of aspects 1 to 9, wherein the transmitting the sidelink discovery probing message further comprises: unicasting the sidelink discovery probing message.

Aspect 11 is the method of any of aspects 1 to 9, wherein the transmitting the discovery probing message further comprises: broadcasting or group-casting the sidelink discovery probing message.

Aspect 12 is the method of any of aspects 1 to 11, wherein the first sidelink device corresponds to an announcing UE, and the sidelink discovery message comprises a presence announcement message.

Aspect 13 is the method of any of aspects 1 to 12, wherein the first sidelink device transmits the sidelink discovery probing message on multiple beams, the method further comprising: receiving the probing response from the second sidelink device on a beam from the multiple beams, wherein the first sidelink device transmits the presence announcement message to the second sidelink device on the beam on which the probing response was received; and monitoring for a connection request from the second sidelink device on the beam on which the probing response was received.

Aspect 14 is the method of any of aspects 1 to 12, wherein transmitting the discovery probing message further comprises: periodically transmitting the discovery probing message.

Aspect 15 is the method of any of aspects 1 to 12, further comprising: performing an RRM procedure that includes transmission of the sidelink discovery probing message.

Aspect 16 is the method of any of aspects 1 to 11, wherein the first sidelink device corresponds to a discoverer UE, and the sidelink discovery message comprises a solicitation message.

Aspect 17 is the method of any of aspects 1 to 11 and 16, wherein the first sidelink device transmits the sidelink discovery probing message on multiple beams, the method further comprising: receiving the probing response from the second sidelink device on a beam from the multiple beams, wherein the first sidelink device transmits the solicitation message to the second sidelink device on the beam on which the probing response was received; and monitoring, on the beam on which the probing response was received, for a response message from the second sidelink device in response to the solicitation message from the second sidelink device.

Aspect 18 is the method of any of aspects 1 to 11 and 16-17, further comprising: determining an occurrence of an aperiodic trigger for the sidelink discovery probing message, wherein the first sidelink device transmits the discovery probing message in response to the trigger.

Aspect 19 is the method of any of aspects 1 to 11 and 16-18, wherein the aperiodic trigger is based on a beam refinement procedure.

Aspect 20 is the method of any of aspects 1 to 19, further comprising: receiving the probing response from the second sidelink device, the probing response indicating a duration of time during which the second sidelink device is available, wherein the first sidelink device transmits the sidelink discovery message to the second sidelink device during the duration of time.

Aspect 21 is a method for wireless sidelink communication between a first sidelink device and a second sidelink device, comprising: at the second sidelink device: receiving a sidelink discovery probing message from the first sidelink device, the sidelink discovery probing message identifying the first sidelink device; transmitting a probing response to the second sidelink device responsive to receiving the sidelink discovery probing message; and monitoring for a sidelink discovery message from the first sidelink device.

Aspect 22 is the method of aspect 21, wherein the sidelink discovery probing message further comprises a beam indication corresponding to at least one beam of multiple beams, the method further comprising: using the at least one beam indicated in the beam indication to monitor for the sidelink discovery message from the first sidelink device.

Aspect 23 is the method of any of aspects 21 to 22, wherein the first sidelink device transmits the probing response using a resource associated with a beam, the method further comprising: using the beam to monitor for the sidelink discovery message from the first sidelink device based on a mapping.

Aspect 24 is the method of any of aspects 21 to 23, wherein the probing response comprises a first ID for the first sidelink device, a second ID of the second sidelink device, and the beam indication for at least one beam.

Aspect 25 is the method of any of aspects 21 to 24, wherein the first sidelink device transmits the probing response on a single beam, the probing response comprising information for multiple beams.

Aspect 26 is the method of any of aspects 21 to 25, further comprising: transmitting, in the probing response, information regarding a duration of time during which the first sidelink device is available for discovery.

Aspect 27 is the method of any of aspects 21 to 26, wherein the sidelink discovery message comprises a presence announcement message from an announcing sidelink device, the method further comprising: receiving the presence announcement message from the announcing sidelink device; and transmitting a connection request to the announcing sidelink device.

Aspect 28 is the method of any of aspects 21 to 26, wherein the sidelink discovery message comprises a solicitation message from a discoverer sidelink device, the method further comprising: receiving the solicitation message from the discoverer sidelink device; and transmitting a response to the solicitation message.

Aspect 29 is an apparatus for wireless communication including at least one processor coupled to a memory and configured to implement a method as in any of aspects 1 to 20.

Aspect 30 is an apparatus for wireless communication including at least one processor coupled to a memory and configured to implement a method as in any of aspects 21 to 28.

Aspect 31 is an apparatus for wireless communication including means for implementing a method as in any of aspects 1 to 20.

Aspect 32 is an apparatus for wireless communication including means for implementing a method as in any of aspects 21 to 28.

Aspect 33 is a computer-readable medium storing computer executable code, where the code when executed by a processor causes the processor to implement a method as in any of aspects 1 to 20.

Aspect 34 is a non-transitory computer-readable storage medium storing computer executable code, where the code when executed by a processor causes the processor to implement a method as in any of aspects 21 to 28.

What is claimed is:

1. A method of wireless communication at a first sidelink device, comprising:
    transmitting, in response to an occurrence of an aperiodic trigger for a sidelink discovery probing message, the sidelink discovery probing message, the aperiodic trigger being based on a beam refinement procedure, the sidelink discovery probing message comprising at least a first identifier of the first sidelink device via multiple beams comprising a first beam;
    monitoring for a probing response from a second sidelink device;
    receiving the probing response on the first beam, the probing response comprising beam information for at least one beam of the multiple beams;
    determining the beam information based on a mapping between a first resource for the sidelink discovery probing message and a second resource for the probing response; and
    transmitting a sidelink discovery message on the at least one beam associated with the beam information.

2. The method of claim 1, further comprising:
    determining a second beam associated with the second resource for the probing response, wherein the first sidelink device transmits the sidelink discovery message to the second sidelink device on the second beam associated with the second resource for the probing response.

3. The method of claim 1, wherein the at least one beam includes the first beam, and wherein the probing response comprises the first identifier for the first sidelink device, a second identifier of the second sidelink device, and information for the at least one beam.

4. The method of claim 3, wherein the first sidelink device receives the probing response on the first beam, the probing response including the information for a plurality of beams.

5. The method of claim 1, wherein transmitting the sidelink discovery probing message further comprises:
    transmitting the sidelink discovery probing message via a sequence.

6. The method of claim 5, wherein the sequence is one of: an m-sequence, a Gold sequence, or a Zadoff-Chu sequence.

7. The method of claim 1, wherein transmitting the sidelink discovery probing message further comprises:
    transmitting the sidelink discovery probing message in sidelink control information (SCI).

8. The method of claim 1, wherein transmitting the sidelink discovery probing message further comprises:
    unicasting the sidelink discovery probing message.

9. The method of claim 1, wherein transmitting the sidelink discovery probing message further comprises:
    broadcasting or group-casting the sidelink discovery probing message.

10. The method of claim 1, wherein the first sidelink device corresponds to an announcing user equipment (UE), and the sidelink discovery message comprises a presence announcement message.

11. The method of claim 10, wherein transmitting the sidelink discovery probing message includes transmitting the sidelink discovery probing message on the multiple beams, the method further comprising:
    receiving the probing response from the second sidelink device on a second beam of the multiple beams, wherein the first sidelink device transmits the presence announcement message to the second sidelink device on the second beam; and
    monitoring for a connection request from the second sidelink device on the second beam.

12. The method of claim 10, wherein transmitting the sidelink discovery probing message further comprises:
    periodically transmitting the sidelink discovery probing message.

13. The method of claim 10, further comprising:
    performing a radio resource management (RRM) procedure that includes transmission of the sidelink discovery probing message.

14. The method of claim 1, wherein the first sidelink device corresponds to a discoverer user equipment (UE), and the sidelink discovery message comprises a solicitation message.

15. The method of claim 14, wherein transmitting the sidelink discovery probing message includes transmitting the sidelink discovery probing message on the multiple beams, the method further comprising:
    receiving the probing response from the second sidelink device on the first beam of the multiple beams, wherein the first sidelink device transmits the solicitation message to the second sidelink device on the first beam; and
    monitoring, on the first beam, for a response message from the second sidelink device in response to the solicitation message from the second sidelink device.

16. The method of claim 1, further comprising:
    receiving the probing response from the second sidelink device, the probing response indicating a duration of time during which the second sidelink device is available, wherein transmitting the sidelink discovery message includes transmitting the sidelink discovery message to the second sidelink device during the duration of time.

17. A method for wireless sidelink communication with a first sidelink device at a second sidelink device, comprising:
    receiving a sidelink discovery probing message from the first sidelink device based on an occurrence of an aperiodic trigger, the sidelink discovery probing message identifying the first sidelink device, the sidelink discovery probing message further comprising a beam indication corresponding to at least one beam of multiple beams, the aperiodic trigger being based on a beam refinement procedure;
    transmitting a probing response to the first sidelink device responsive to the sidelink discovery probing message; and
    monitoring, at the second sidelink device, monitoring for a sidelink discovery message from the first sidelink device, wherein the monitoring is based on a mapping between a first resource for the sidelink discovery probing message and a second resource for the probing response.

18. The method of claim 17, wherein transmitting the probing response includes transmitting the probing response using the second resource associated with a second beam, the method further comprising:
    using the second beam to monitor for the sidelink discovery message from the first sidelink device based on the mapping.

19. The method of claim 17, wherein the probing response comprises a first identifier for the first sidelink device, a second identifier of the second sidelink device, and the beam indication for the at least one beam.

20. The method of claim 19, wherein transmitting the probing response includes transmitting the probing response on a single beam, the probing response comprising information for the multiple beams.

21. The method of claim 17, further comprising:
    transmitting, in the probing response, information regarding a duration of time during which the second sidelink device is available for discovery.

22. The method of claim 17, wherein the sidelink discovery message comprises a presence announcement message from an announcing sidelink device, the method further comprising:
    receiving the presence announcement message from the announcing sidelink device; and
    transmitting a connection request to the announcing sidelink device.

23. The method of claim 17, wherein the sidelink discovery message comprises a solicitation message from a discoverer sidelink device, the method further comprising:
    receiving the solicitation message from the discoverer sidelink device; and
    transmitting a response to the solicitation message.

24. An apparatus for wireless communication at a first sidelink device, comprising:
    means for transmitting, in response to an occurrence of an aperiodic trigger for a sidelink discovery probing message, the sidelink discovery probing message, the aperiodic trigger being based on a beam refinement procedure, the sidelink discovery probing message comprising at least a first identifier of the first sidelink device via multiple beams comprising a first beam;
    means for monitoring for a probing response from a second sidelink device;
    means for receiving the probing response on the first beam of the multiple beams, the probing response comprising beam information for at least one beam of the multiple beams;
    means for determining the beam information based on a mapping between a first resource for the sidelink discovery probing message and a second resource for the probing response; and
    means for transmitting a sidelink discovery message on the at least one beam associated with the beam information.

25. An apparatus for wireless communication with a first sidelink device at a second sidelink device, comprising:
   means for receiving a sidelink discovery probing message from the first sidelink device based on an occurrence of an aperiodic trigger, the sidelink discovery probing message identifying the first sidelink device, the sidelink discovery probing message further comprising a beam indication corresponding to at least one beam of multiple beams, the aperiodic trigger being based on a beam refinement procedure;
   means for transmitting a probing response to the first sidelink device responsive to the sidelink discovery probing message; and
   means for monitoring for a sidelink discovery message from the first sidelink device, wherein the monitoring is based on a mapping between a first resource for the sidelink discovery probing message and a second resource for the probing response.

26. An apparatus for wireless sidelink communication at a first sidelink device, comprising:
   one or more memories; and
   one or more processors coupled to the one or more memories, the one or more processors configured to cause the first sidelink device to:
      transmit, in response to an occurrence of an aperiodic trigger for a sidelink discovery probing message, the sidelink discovery probing message, the aperiodic trigger being based on a beam refinement procedure, the sidelink discovery probing message comprising at least a first identifier of the first sidelink device via multiple beams comprising a first beam;
      monitor for a probing response from a second sidelink device;
      receive the probing response on the first beam, the probing response comprising beam information for at least one beam of the multiple beams;
      determine the beam information based on a mapping between a first resource for the sidelink discovery probing message and a second resource for the probing response; and
      transmit a sidelink discovery message on the at least one beam associated with the beam information.

27. The apparatus of claim 26, further comprising one or more antennas coupled to the one or more processors, wherein the first sidelink device corresponds to an announcing user equipment (UE), and the sidelink discovery message comprises a presence announcement message.

28. The apparatus of claim 26, further comprising one or more antennas coupled to the one or more processors, wherein the first sidelink device corresponds to a discoverer user equipment (UE), and the sidelink discovery message comprises a solicitation message.

29. The apparatus of claim 26, wherein the one or more processors are individually or collectively configured to determine the occurrence of the aperiodic trigger for the sidelink discovery probing message, transmit, in response to the occurrence of the aperiodic trigger for the sidelink discovery probing message, the sidelink discovery probing message comprising at least the first identifier of the first sidelink device via the multiple beams comprising the first beam, monitor for the probing response from the second sidelink device, receive the probing response on the first beam, determine the beam information based on the mapping between the first resource for the sidelink discovery probing message and the second resource for the probing response, and transmit the sidelink discovery message on the at least one beam associated with the beam information.

30. An apparatus for wireless sidelink communication with a first sidelink device at a second sidelink device, comprising:
   one or more memories; and
   one or more processors coupled to the one or more memories, the one or more processors configured to cause the second sidelink device to:
      receive a sidelink discovery probing message from the first sidelink device based on an occurrence of an aperiodic trigger, the sidelink discovery probing message configured to identify the first sidelink device, the sidelink discovery probing message further comprising a beam indication corresponding to at least one beam of multiple beams, the aperiodic trigger being based on a beam refinement procedure;
      transmit a probing response to the first sidelink device responsive to the sidelink discovery probing message; and
      monitor for a sidelink discovery message from the first sidelink device based on a mapping between a first resource for the sidelink discovery probing message and a second resource for the probing response.

31. The apparatus of claim 30, further comprising one or more antennas coupled to the one or more processors, wherein the sidelink discovery message comprises a presence announcement message from an announcing sidelink device, and wherein the one is or more processors are further configured to cause the second sidelink device to:
   receive the presence announcement message from the announcing sidelink device; and
   transmit a connection request to the announcing sidelink device.

32. The apparatus of claim 30, further comprising one or more antennas coupled to the one or more processors, wherein the sidelink discovery message comprises a solicitation message from a discoverer sidelink device, and wherein the one is or more processors are further configured to cause the second sidelink device to:
   receive the solicitation message from the discoverer sidelink device; and
   transmit a response to the solicitation message.

33. The apparatus of claim 30, wherein the one or more processors are individually or collectively configured to receive, based on the occurrence of the aperiodic trigger, the sidelink discovery probing message from the first sidelink device, transmit the probing response to the first sidelink device responsive to the sidelink discovery probing message, and monitor for the sidelink discovery message from the first sidelink device.

34. A non-transitory computer-readable storage medium comprising computer-executable code at a first sidelink device, the computer-executable code, when executed, causes one or more processors of the first sidelink device to:
   transmit, in response to an occurrence of an aperiodic trigger for a sidelink discovery probing message, the sidelink discovery probing message, the aperiodic trigger being based on a beam refinement procedure, the sidelink discovery probing message comprising at least a first identifier of the first sidelink device via multiple beams comprising a first beam;
   monitor for a probing response from a second sidelink device;
   receive the probing response on the first beam, the probing response comprising beam information for at least one beam of the multiple beams;

determine the beam information based on a mapping between a first resource for the sidelink discovery probing message and a second resource for the probing response; and transmit a sidelink discovery message on the at least one beam associated with the beam information.

35. The non-transitory computer-readable storage medium of claim 34, wherein the first sidelink device corresponds to an announcing user equipment (UE), and the sidelink discovery message comprises a presence announcement message.

36. The non-transitory computer-readable storage medium of claim 34, wherein the first sidelink device corresponds to a discoverer user equipment (UE), and the sidelink discovery message comprises a solicitation message.

37. A non-transitory computer-readable storage medium comprising computer-executable code for wireless sidelink communication with a first sidelink device at a second sidelink device, the computer-executable code, when executed, causes one or more processors of the second sidelink device to:

receive a sidelink discovery probing message from the first sidelink device based on an occurrence of an aperiodic trigger, the sidelink discovery probing message configured to identify the first sidelink device, the sidelink discovery probing message further comprising a beam indication corresponding to at least one beam of multiple beams, the aperiodic trigger being based on a beam refined procedure;

transmit a probing response to the first sidelink device responsive to the sidelink discovery probing message; and monitor for a sidelink discovery message from the first sidelink device based on a mapping between a first resource for the sidelink discovery probing message and a second resource for the probing response.

38. The non-transitory computer-readable storage medium of claim 37, wherein the sidelink discovery message comprises a presence announcement message from an announcing sidelink device, and wherein the computer-executable code, when executed, causes the one or more processors of the second sidelink device to:

receive the presence announcement message from the announcing sidelink device; and transmit a connection request to the announcing sidelink device.

39. The non-transitory computer-readable storage medium of claim 37, wherein the sidelink discovery message comprises a solicitation message from a discoverer sidelink device, and wherein the computer-executable code, when executed, causes the processor one or more processors of the second sidelink device to:

receive the solicitation message from the discoverer sidelink device; and transmit a response to the solicitation message.

* * * * *